N MESSENGER.
Cultivator.
No. 30,745.
Patented Nov 27, 1860.
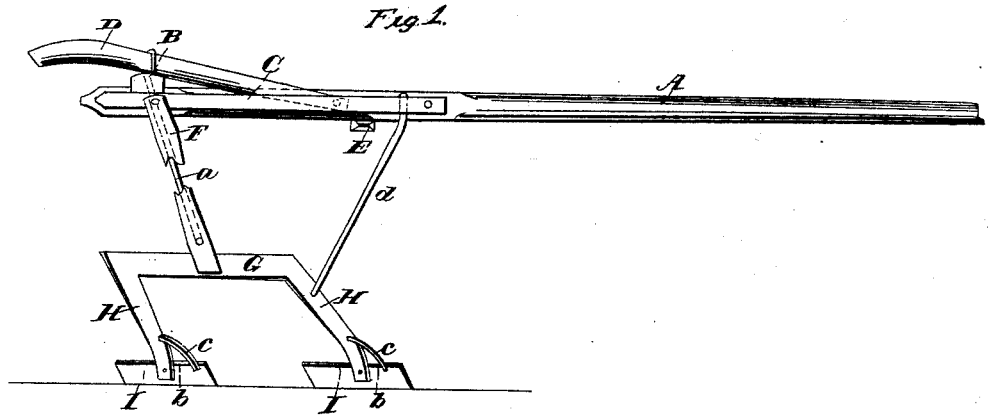
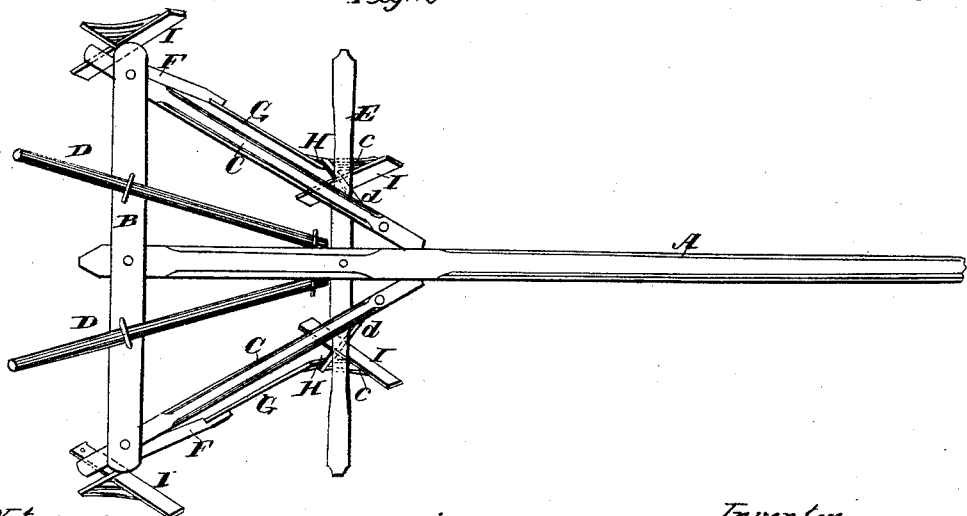
Witnesses
J W Coombs
R. S. Spencer
Inventor
Nelson Messenger
her Munn & Co
Attys.

UNITED STATES PATENT OFFICE.

NELSON MESSENGER, OF NEWARK, ILLINOIS.

IMPROVEMENT IN CULTIVATORS.

Specification forming part of Letters Patent No. 30,745, dated November 27, 1860.

*To all whom it may concern:*

Be it known that I, NELSON MESSENGER, of Newark, in the county of Kendall and State of Illinois, have invented a new and Improved Cultivator; and I do hereby declare that the following is a full, clear, and exact description of the same, reference being had to the annexed drawings, making a part of this specification, in which—

Figure 1 is a side elevation of my invention; Fig. 2, a plan or top view of the same.

Similar letters of reference indicate corresponding parts in the two figures.

The object of this invention is to obtain a simple and efficient cultivator of light draft, one that may be manipulated with facility, so as to be under the complete control of the driver or attendant, and leave the ground not only in a loose, light state, permeable to air and moisture, but also in a state favorable for the subsequent cultivation of the crop.

The invention consists in the employment or use of four shares, arranged and applied to the frame or stock of the implement, as hereinafter fully shown and described, so as to effect the desired end.

To enable those skilled in the art to fully understand and construct my invention, I will proceed to describe it.

A represents the draft-pole of the implement, to the back end of which a cross-bar, B, is attached at right angles and braced from the pole A by oblique or diagonal rods C, as shown clearly in Fig. 2.

D D are handles, which are attached to the draft-pole A and bar B; and E is the doubletree, which is attached to the draft-pole A at about the front ends of the handles D D.

To the back part of each brace or rod C there is attached a foot or standard, F. These standards are braced from the bar B by rods $a$, the upper ends of which are attached to the bar B near the junction of the draft-pole A with it.

To the lower end of each foot or standard, F, there is attached a horizontal bar, G, to each end of which there is a pendent foot or bar, H, having each a share, I, attached. Each bar G and its feet H H may be formed from a single piece of metal, and the feet are somewhat twisted so as to give the shares I a proper position. The shares I are simply flat plates secured to the lower ends of the bars or feet H by rivets $b$ and braces $c$. The shares I have oblique positions relatively with each other, the back ends of each pair being nearer together than the front ends, the obliquity being such that each share will make a furrow equal in width to about half of the length of the shares. The bars G G also have an oblique position relatively with each other, the front ends of said bars being nearer together than the back ends, sufficiently so to admit of the back shares working in lines at the outer sides of the front ones, and causing the furrows made by the latter to be filled by the back shares. The front ends of the bars G G are braced from the draft-pole A by rods $d$.

From the above description it will be seen that a very light implement of easy draft and with four shares is obtained. In consequence of having the horizontal bars G provided with a foot, H, at each end, and the bars G attached to standards F, but very little frame-work is required, very much less than if four feet or standards were employed, one for each share, and each standard attached direct to the framing. The shares work each side of the rows, and a horse is also at each side of the same.

I do not claim broadly a cultivator provided with four shares; but

I do claim as new and desire to secure by Letters Patent—

The arrangement of the horizontal bars G G with the pendent feet or bars H, having the shares I attached, in connection with the standards F, to which the bars G are attached, the standards F being braced by rods $a$ and the bars G braced by the rods $d$, as and for the purpose herein set forth.

NELSON MESSENGER.

Witnesses:
SANFORD ROBINSON,
JOHN HOLLENBACK.